US011077717B2

(12) United States Patent
Kato (10) Patent No.: US 11,077,717 B2
(45) Date of Patent: Aug. 3, 2021

(54) PNEUMATIC TIRE

(71) Applicant: The Yokohama Rubber Co., LTD., Tokyo (JP)

(72) Inventor: Yoshitaka Kato, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/499,797

(22) PCT Filed: Jan. 25, 2018

(86) PCT No.: PCT/JP2018/002291
§ 371 (c)(1),
(2) Date: Sep. 30, 2019

(87) PCT Pub. No.: WO2018/179756
PCT Pub. Date: Oct. 4, 2018

(65) Prior Publication Data
US 2020/0039298 A1     Feb. 6, 2020

(30) Foreign Application Priority Data
Mar. 30, 2017   (JP) .............................. JP2017-068468

(51) Int. Cl.
*B60C 11/03*     (2006.01)

(52) U.S. Cl.
CPC ....... *B60C 11/0316* (2013.01); *B60C 11/0311* (2013.01); *B60C 2011/0313* (2013.01);
(Continued)

(58) Field of Classification Search
CPC ........... B60C 11/0311; B60C 2011/039; B60C 2200/065; B60C 11/11
See application file for complete search history.

(56) References Cited

U.S. PATENT DOCUMENTS 3,939,890 A * 2/1976 Abe ..................... B60C 11/00
                                                 152/209.14
5,180,453 A   1/1993 Fukasawa et al.
(Continued)

FOREIGN PATENT DOCUMENTS

JP        61249806 A  * 11/1986   .......... B60C 11/0311
JP        H03-014703     1/1991
(Continued)

OTHER PUBLICATIONS

International Search Report for International Application No. PCT/JP2018/002291 dated Mar. 27, 2018, 4 pages, Japan.

*Primary Examiner* — Robert C Dye
*Assistant Examiner* — Farah Taufiq
(74) *Attorney, Agent, or Firm* — Thorpe North & Western (57) ABSTRACT

A pneumatic tire includes a tread; sidewalls; beads inward of the sidewalls; lug grooves formed in the tread and inclined symmetrically about the equator, an inclination angle α of the lug grooves with respect to the lateral direction being 15°≤α≤45°; and shoulder grooves connecting the lug grooves and inclined in an opposite direction to the lug grooves, a center line of the shoulder grooves at both sides meeting with two of the lug grooves at intersection points. A difference between distances L1, L2 from the equator to the intersection points and a tread width TW satisfy TW×0.03≤|L1−L2|≤TW×0.2. An average value of the distances and the tread width TW satisfy TW×0.15≤(L1+L2)/2≤TW×0.35. A groove area ratio of the tread is from 0.4 to 0.7.

12 Claims, 7 Drawing Sheets

(52) U.S. Cl.
CPC ............... *B60C 2011/0365* (2013.01); *B60C 2011/0369* (2013.01); *B60C 2200/065* (2013.01)

(56) References Cited

U.S. PATENT DOCUMENTS

| | | | |
|---|---|---|---|
| 5,411,067 A * | 5/1995 | Beeghly | B60C 11/1369 152/209.12 |
| 2005/0133141 A1 | 6/2005 | Neubauer et al. | |
| 2010/0032067 A1 | 2/2010 | Neubauer et al. | |
| 2014/0116590 A1 * | 5/2014 | Dixon | B60C 11/1369 152/209.22 |
| 2018/0086146 A1 * | 3/2018 | Wilson | B60C 11/0316 |

FOREIGN PATENT DOCUMENTS

| | | |
|---|---|---|
| JP | 2001-063319 | 3/2001 |
| JP | 2003-205706 | 7/2003 |
| JP | 2005-178768 | 7/2005 |
| JP | 2010-042806 | 2/2010 |
| JP | 2013-159321 | 8/2013 |
| JP | 2014-084109 | 5/2014 |
| JP | 2014-234091 | 12/2014 |
| JP | 2016-215661 | 12/2016 |

* cited by examiner

PNEUMATIC TIRE

TECHNICAL FIELD

The present technology relates to a pneumatic tire suitable for a construction vehicle, in particular a scraper vehicle, and particularly relates to a pneumatic tire capable of providing traction performance and low heat build-up in a compatible manner to a high degree.

BACKGROUND ART

For pneumatic tires used on construction vehicles typified by scraper vehicles, traction performance is important. Thus, a tread pattern typically employed includes a tread portion provided with a plurality of lug main grooves that extend in the tire lateral direction and open on both sides of a tire equator to a tread edge (for example, see Japan Unexamined Patent Publication No. 2016-215661).

In particular, to ensure traction performance, a directional tread pattern is effective (for example, see Japan Unexamined Patent Publication Nos. 2001-63319, 2013-159321, 2014-234091). However, pneumatic tires for a construction vehicle as described above are used over long distances in severe conditions, thus, in addition to traction performance, there is a demand for low heat build-up from the perspective of durability.

SUMMARY

The present technology provides a pneumatic tire capable of providing traction performance and low heat build-up in a compatible manner to a high degree.

A pneumatic tire of an embodiment of the present technology comprises:

an annular tread portion extending in a tire circumferential direction;

a pair of sidewall portions disposed on either side of the tread portion; and a pair of bead portions disposed inward of the sidewall portions in a tire radial direction;

lug main grooves extending in a tire lateral direction and opening to a tread edge being formed on either side of a tire equator in the tread portion, the lug main grooves being inclined with respect to the tire lateral direction in a symmetrical manner about the tire equator, an inclination angle α of the lug main grooves with respect to the tire lateral direction at a position 25% of a tread width from the tire equator being set to a range $15°≤α≤45°$;

shoulder inclined grooves connecting lug main grooves adjacent in the tire circumferential direction being formed in the tread portion, the shoulder inclined grooves each being inclined in an opposite direction to a corresponding lug main groove of the lug main grooves, a center line of the shoulder inclined grooves at both sides meeting with two of the lug main grooves at two intersection points P1, P2, a difference between a distance L1 from the tire equator to the intersection point P1 and a distance L2 from the tire equator to the intersection point P2 and a tread width TW satisfy a relationship $TW×0.03≤|L1−L2|≤TW×0.2$, and an average value of the distances L1, L2 and the tread width TW satisfy a relationship $TW×0.15≤(L1+L2)/2≤TW×0.35$; and a groove area ratio of the tread portion being from 0.4 to 0.7.

In the present technology, by the lug main grooves that extend in the tire lateral direction and open to the tread edge and the shoulder inclined grooves that connect the lug main grooves adjacent in the tire circumferential direction being formed in the tread portion and by specifying the inclination angle α of the lug main grooves, the inclination direction of the shoulder inclined grooves, the difference between the distances L1, L2 ($|L1−L2|$) from the tire equator to the intersection points P1, P2 where the center line of the shoulder inclined groove meets the lug main grooves, the average value $((L1+L2)/2)$ of the distances L1, L2, and the groove area ratio of the tread portion, a heat dissipation effect when the tire is running is sufficiently ensured, thus enhancing low heat build-up and traction performance can be exhibited at the maximum. As a result, traction performance and low heat build-up can be provided in a compatible manner to a higher degree than conventional technologies. Moreover, ensuring low heat build-up contributes to enhancing durability.

In the present technology, preferably, positions of the lug main grooves are offset in the tire circumferential direction on either side of the tire equator; and an offset amount S of the lug main grooves and a pitch P of the lug main grooves in the tire circumferential direction satisfy a relationship $0.3≤S/P≤0.5$. By offsetting the positions of the lug main grooves in the tire circumferential direction on either side of the tire equator, a momentary increase in ground contact pressure and sudden deformation of the block end portions when the tire rotates can be suppressed, and heat build-up of the tread portion can be reduced.

Preferably, a groove depth D1 of the shoulder inclined grooves at a central position in a longitudinal direction and a groove depth D2 of the lug main grooves at a position 25% of the tread width from the tire equator satisfy a relationship $0.3≤D1/D2≤0.7$. By the shoulder inclined grooves being shallower than the lug main grooves, the traction performance at least until the intermediate stages of wear is sufficiently ensured, block rigidity near the shoulder inclined grooves can be increased, and low heat build-up can be favorably ensured.

Preferably, center inclined grooves connecting the lug main grooves located on either side of the tire equator are formed in the tread portion; and a width W3 of the center inclined grooves at a central position in a longitudinal direction and the width W1 of the lug main grooves at the tread edge satisfy a relationship $0.3≤W3/W1≤0.8$. By providing the center inclined grooves that extend across the tire equator and connect the lug main grooves in the center region of the tread portion where the ground contact pressure is high, the traction performance can be effectively enhanced. In the center region of the tread portion, the ground contact pressure is high and block deformation is great. However, by the center inclined grooves being narrow, block rigidity near the center region inclined grooves can be increased and low heat build-up can be favorably ensured.

Preferably, a groove depth D3 of the center inclined grooves at a central position in a longitudinal direction and a groove depth D2 of the lug main grooves at a position 25% of the tread width from the tire equator satisfy a relationship $0.3≤D3/D2≤0.7$. By the center inclined grooves being shallower than the lug main grooves, the traction performance at least until the intermediate stages of wear is sufficiently ensured, block rigidity near the center inclined grooves can be increased, and low heat build-up can be favorably ensured.

Preferably, a narrow groove that opens at both ends to the lug main grooves is formed at a bottom portion of each of the center inclined grooves; and a width W4 of the narrow groove and the width W3 of the center inclined grooves at the central position in the longitudinal direction satisfy a relationship $0.05 \leq W4/W3 \leq 0.5$. By providing the narrow groove in the bottom portion of the center inclined groove disposed in the center region of the tread portion where the ground contact pressure is high in this way, heat dissipation efficiency can be increased and low heat build-up can be effectively enhanced. Moreover, since the narrow grooves are narrower than the center inclined grooves, an increase in the heat build-up caused by block movement can be suppressed without impairing the block rigidity near the center inclined grooves.

Preferably, a groove depth D4 of the narrow groove with the road contact surface of the tread portion as a reference and the groove depth D2 of the lug main grooves at a position 25% of the tread width from the tire equator satisfy a relationship $0.5 \leq D4/D2 \leq 1.0$. By specifying the groove depth D4 of the narrow groove, the traction performance at least until the intermediate stages of wear is sufficiently ensured, and low heat build-up can be favorably ensured without impairing the block rigidity near the center inclined grooves.

In the present technology, "tread width" refers to the ground contact width in the tire axial direction as measured when the tire is mounted on a regular rim and inflated to a regular internal pressure, and placed vertically upon a flat surface with a regular load applied thereto. "Tread edge" refers to the edge portion (ground contact edge) in the tire axial direction of the ground contact region specified by the ground contact width. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (The European Tyre and Rim Technical Organisation). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO.

In the present technology, each dimension is measured with the tire mounted on a regular rim and inflated to the regular internal pressure. Additionally, "groove area ratio of the tread portion" is the ratio of the groove area in the ground contact region to the area of the ground contact region of the tread portion.

BRIEF DESCRIPTION OF DRAWINGS

FIGS. 4A and 4B are diagrams illustrating an airflow generated in a tread portion.

DETAILED DESCRIPTION

Figure 1:
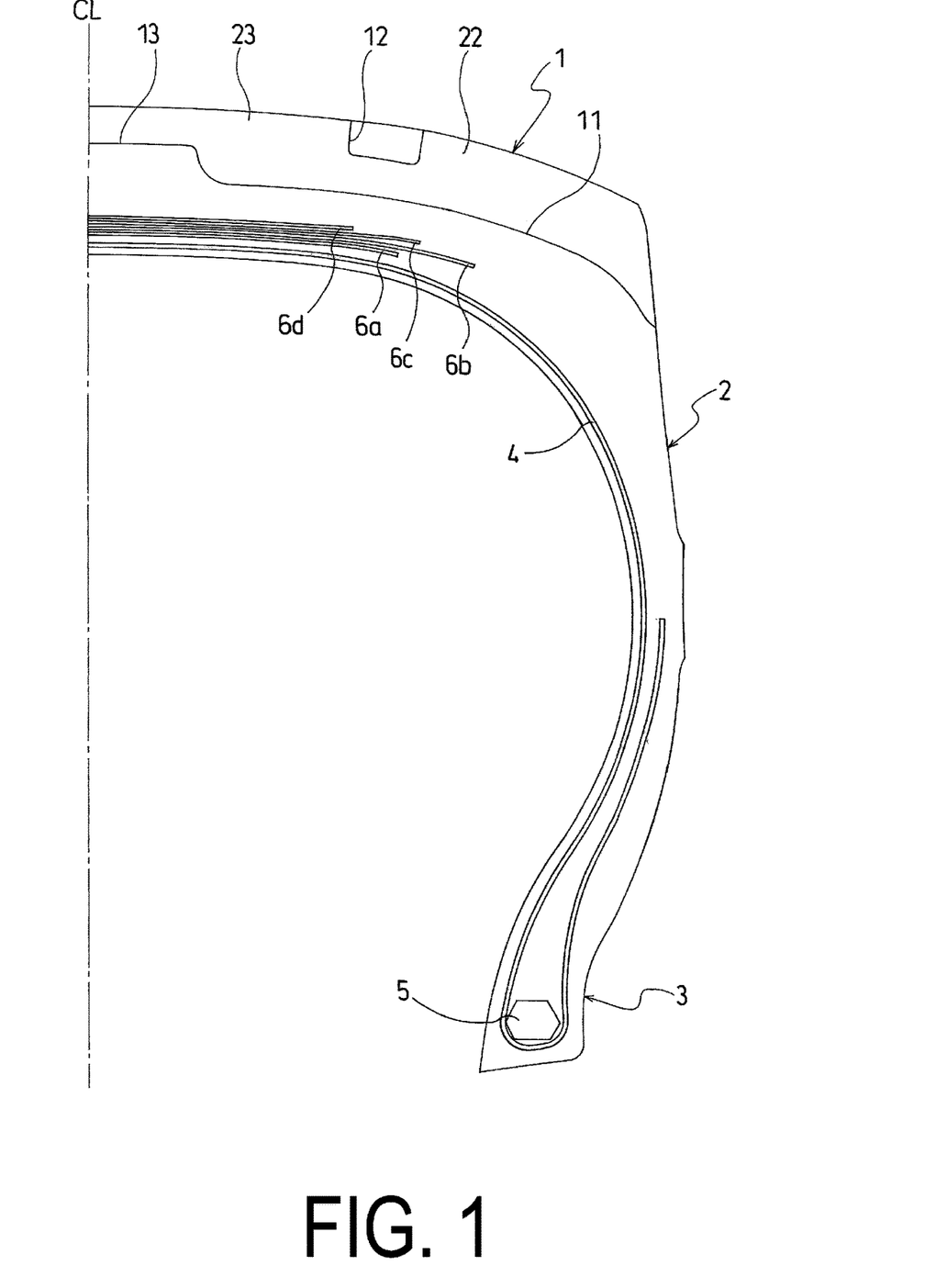
FIG. 1 is a meridian cross-sectional view illustrating the pneumatic tire according to an embodiment of the present technology.
Figure 2:
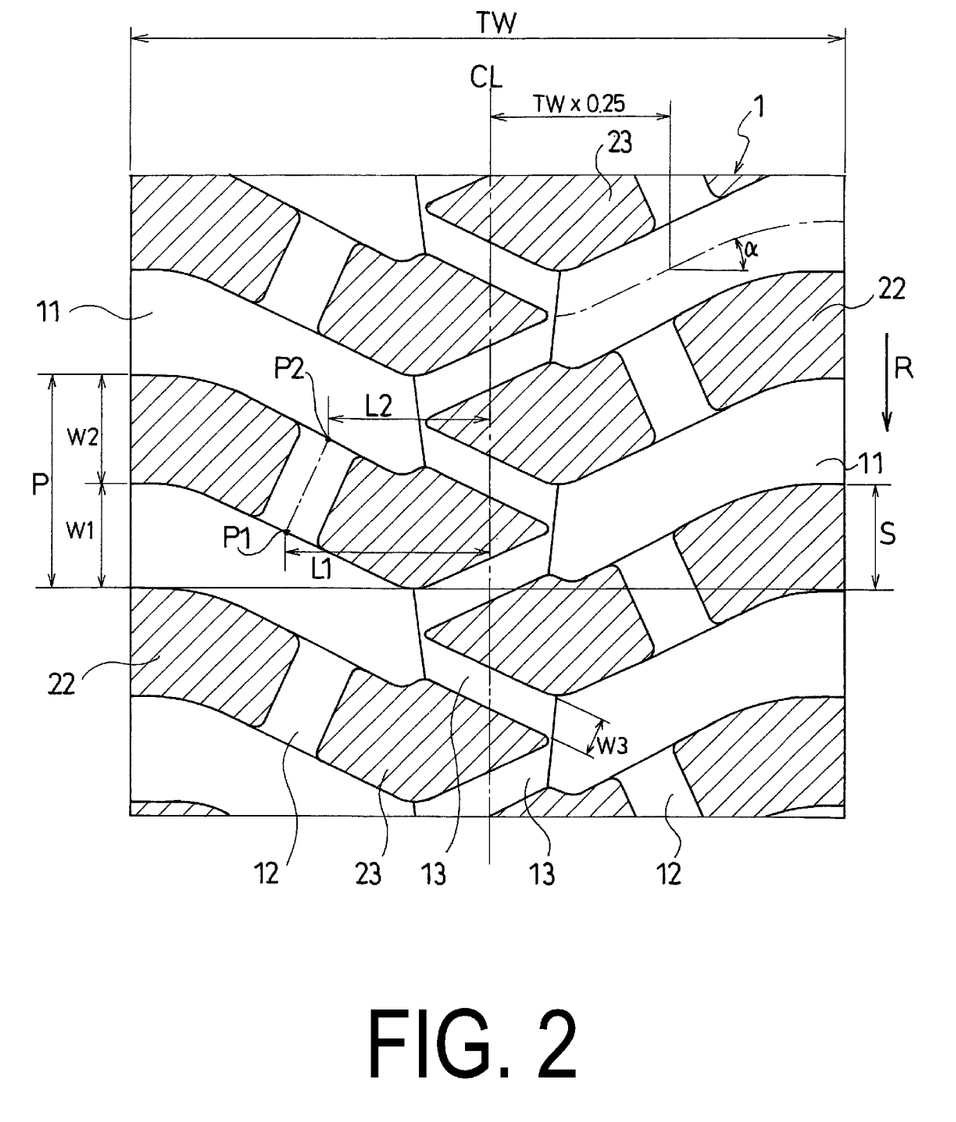
FIG. 2 is a plan view illustrating a tread pattern of a pneumatic tire according to an embodiment of the present technology.
Figure 3:
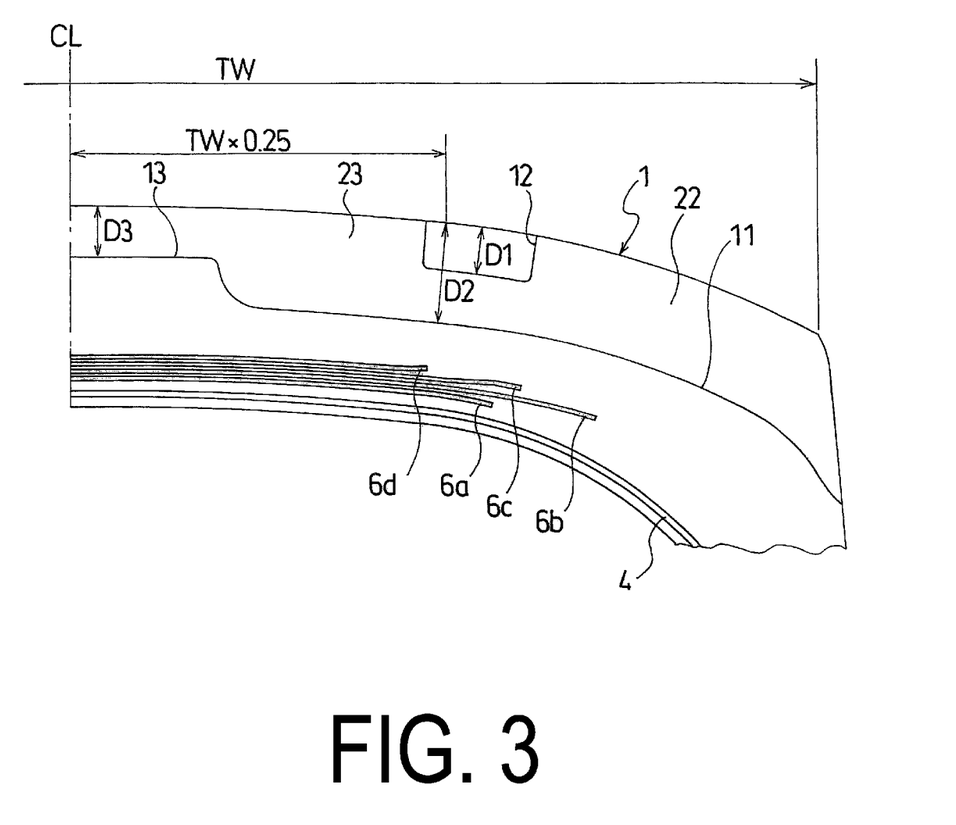
FIG. 3 is a cross-sectional view illustrating a tread portion of a pneumatic tire according to an embodiment of the present technology.

Configurations of embodiments of the present technology are described in detail below with reference to the accompanying drawings. FIGS. 1 to 3 illustrate a pneumatic tire for a scraper vehicle according to an embodiment of the present technology. In FIG. 1, only the structure on one side of a tire equator CL in the tire lateral direction is illustrated, but the pneumatic tire is provided with a symmetrical structure on the other side of the pneumatic tire. In FIG. 2, in order to facilitate understanding of the tread structure, a portion that comes into contact with the road surface when the tire is running is depicted as a hatched portion.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction. The tread portion 1 includes a square shoulder, and a shoulder edge thereof is a ground contact edge.

At least one carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. Preferably, steel cords are used as the reinforcing cords of the carcass layer 4 but organic fiber cords such as polyester fiber cords and the like can also be used.

A plurality of belt layers 6a, 6b, 6c, 6d are embedded on the outer circumferential side of the carcass layer 4 in the tread portion 1. The belt layers 6a to 6d each include a plurality of reinforcing cords that are inclined with respect to the tire circumferential direction, with the reinforcing cords of the discretionary different layers arranged in a criss-cross manner. In the belt layers 6a to 6d, the inclination angle of the reinforcing cords with respect to the tire circumferential direction ranges from, for example, 10° to 40°. Steel cords are preferably used as the reinforcing cords of the belt layers 6a to 6d.

Note that the tire internal structure described above represents a typical example for a pneumatic tire, and the pneumatic tire is not limited thereto.

As illustrated in FIG. 2, a plurality of lug main grooves 11 positioned on each side of the tire equator CL that extend in the tire lateral direction are formed in a tread portion 1 at intervals in a tire circumferential direction. The lug main grooves 11 each include an inner end portion in the tire lateral direction that terminates at a position separated from the tire equator CL and an outer end portion in the tire lateral direction that opens to the tread edge. The lug main grooves 11 on each side of the tire equator CL are inclined symmetrically with respect to the tire lateral direction. In other words, the lug main grooves 11 each incline in one direction in the tire circumferential direction (the opposite direction to a rotation direction R) outward in the tire lateral direction. An inclination angle $\alpha$ of the lug main grooves 11 with respect to the tire lateral direction at a position 25% of a tread width TW from the tire equator CL is set in the range $15°\leq\alpha\leq 45°$. The inclination angle $\alpha$ is the inclination angle of the center line of the lug main groove 11. In addition, a width W1 of the lug main groove 11 at the tread edge and an interval W2 between lug main grooves 11 at the tread edge preferably satisfy the relationship $0.7\leq W1/W2\leq 1.5$ to ensure good traction performance.

A plurality of shoulder inclined grooves 12 that connect the lug main grooves 11, 11 adjacent in the tire circumferential direction are formed in the tread portion 1. The shoulder inclined grooves 12 are inclined in the opposite direction to the corresponding lug main grooves 11. In other words, the shoulder inclined grooves 12 are inclined in the opposite direction to the lug main grooves 11 they connect to. The center line of the shoulder inclined grooves 12 meets the lug main grooves 11 on either side at two intersection points P1, P2. The difference between a distance L1 from the tire equator CL to the intersection point P1 located on the forward side of the rotation direction R and a distance L2 from the tire equator CL to the intersection P2 located on the backward side in the rotation direction R and the tread width TW satisfy the relationship $TW\times 0.03\leq|L1-L2|\leq TW\times 0.2$, and the average value thereof and the tread width TW satisfy the relationship $TW\times 0.15\leq(L1+L2)/2\leq TW\times 0.35$. The difference in the distances L1, L2 means the distance in the tire lateral direction to the intersection points P1, P2, and the average value of the distances L1, L2 means the position of the shoulder inclined groove 12 in the tire lateral direction. As a result, a plurality of shoulder blocks 22 are defined by the lug main grooves 11 and the shoulder inclined grooves 12 in the shoulder regions of the tread portion 1.

Furthermore, a plurality of center inclined grooves 13 that connect the lug main grooves 11 on either side of the tire equator CL are formed in the tread portion 1. The inclination directions of the center inclined grooves 13 with respect to the tire lateral direction are alternately inverted in the tire circumferential direction. Also, two center inclined grooves 13, 13 are connected to the inner end portion in the tire lateral direction of one lug main groove 11 and branched off, communicating with different lug main grooves 11 located on the opposite side of the tire equator CL. As a result, a plurality of center blocks 23 are defined by the lug main grooves 11, the shoulder inclined grooves 12, and the center inclined grooves 13 in the center region of the tread portion 1.

The pneumatic tire described above includes the lug main grooves 11, the shoulder inclined grooves 12, and the center inclined grooves 13 in the tread portion 1. As a result, the groove area ratio of the tread portion 1 is set in a range from 0.4 to 0.7. In other words, the ratio of the groove area (area of the region other than the hatched portion) to the area of the ground contact region having the tread width TW is set to be in the range described above.

In the pneumatic tire described above, by the lug main grooves 11 that extend in the tire lateral direction and open to the tread edge and the shoulder inclined grooves 12 that connect the lug main grooves 11 adjacent in the tire circumferential direction being formed in the tread portion 1 and by specifying the inclination angle $\alpha$ of the lug main grooves 11, the inclination direction of the shoulder inclined grooves 12, the difference between the distances L1, L2 (|L1−L2|) from the tire equator CL to the intersection points P1, P2 where the center line of the shoulder inclined groove 12 meets the lug main grooves 11, the average value ((L1+L2)/2) of the distances L1, L2, and the groove area ratio of the tread portion 1, a heat dissipation effect when the tire is running is sufficiently ensured, thus enhancing low heat build-up and traction performance can be exhibited at the maximum.

More specifically, the lug main grooves 11 are disposed so as to be inclined in a symmetrical manner about the tire equator CL, and the inclination angle $\alpha$ of the lug main grooves 11 with respect to the tire lateral direction is within the range $15°\leq\alpha\leq 45°$ at a position 25% of the tread width TW from the tire equator CL, and more preferably in the range $25°\leq\alpha\leq 35°$. This allows the grit in the lug main grooves 11 to be effectively discharged from the center region of the tread portion 1 outward in the tire lateral direction and good traction performance to be exhibited. When the inclination angle $\alpha$ of the lug main grooves 11 is too small, grit easily clogs the lug main grooves 11. When the inclination angle $\alpha$ is too large, traction performance is reduced.

Also, by additionally providing the shoulder inclined grooves 12 that connect the lug main grooves 11, 11 adjacent in the tire circumferential direction in the tread portion 1, the groove area is increased, allowing good traction performance to be achieved. Moreover, since the shoulder inclined grooves 12 are inclined in the opposite direction to the lug main grooves 11, a good heat dissipation effect can be ensured via an air flow generated at the tread portion 1.

Figure 4A:
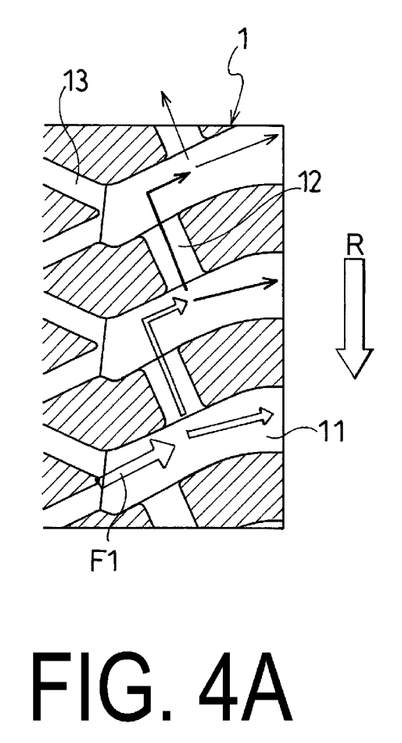
FIG. 4A is a plan view illustrating an airflow generated in a structure according to an embodiment of the present technology.
Figure 4B:
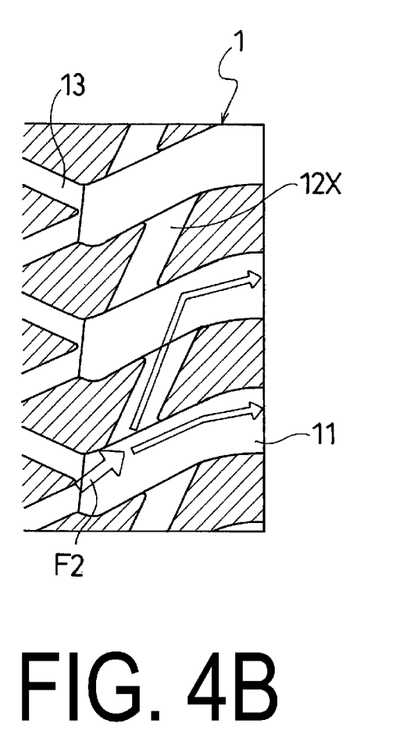
FIG. 4B is a plan view illustrating an airflow generated in a conventional structure different from embodiments of the present technology.

In other words, as illustrated in FIG. 4A, in a structure of an embodiment of the present technology, an air flow F1 is generated in the tread portion 1 when the pneumatic tire rotates in the rotational direction R, the air in the lug main groove 11 moves outward in the tire lateral direction through the lug main groove 11, and a portion of the air turns inward in the tire lateral direction through the shoulder inclined groove 12. This movement of air is repeated, and as a result, an effective heat dissipation effect in the tread portion 1 is obtained. Such a heat dissipation effect can also be obtained when the pneumatic tire is rotating in reverse. On the other hand, as illustrated in FIG. 4B, in a structure in which the shoulder inclined grooves 12 are inclined in the same direction as the lug main grooves 11, an air flow F2 is generated in the tread portion 1 when the pneumatic tire rotates in the rotational direction R, the air in the lug main groove 11 moves outward in the tire lateral direction through the lug main groove 11, and a portion of the air turns outward in the tire lateral direction through the shoulder inclined groove 12. As a result, a sufficient heat dissipation effect in the tread portion 1 is not obtained.

To obtain a heat dissipation effect such as described above, the difference between the distances L1, L2 from the tire equator CL to the intersection points P1, P2 with the shoulder inclined grooves 12 and the tread width TW satisfy the relationship $TW\times 0.03\leq|L1-L2|\leq TW\times 0.2$ and more preferably satisfy the relationship $TW\times 0.05\leq|L1-L2|\leq TW\times 0.1$. This allows a heat dissipation effect to be sufficiently ensured. Here, when the difference between the distances L1, L2 is too small, the heat dissipation effect is insufficient. When the difference is too large, the acute angle of the block results in increased movement of the block during contact. Thus, the amount of heat generated is increased.

Also, to obtain a heat dissipation effect such as described above, the average value of the distances L1, L2 from the tire equator CL to the intersection points P1, P2 with the shoulder inclined grooves 12 and the tread width TW satisfy the relationship $TW \times 0.15 \leq (L1+L2)/2 \leq TW \times 0.35$. This allows a heat dissipation effect to be sufficiently ensured. Here, when the average value of the distances L1, L2 deviates from the range described above, it becomes difficult to obtain a heat dissipation effect across the entire tread portion 1.

Additionally, the groove area ratio of the tread portion 1 is set in the range from 0.4 to 0.7. This allows traction performance and low heat build-up to be provided in a compatible manner. Here, when the groove area ratio of the tread portion 1 is too small, traction performance is decreased. When the groove area ratio is too large, movement of the block is increased, thus increasing the amount of heat generated.

In the pneumatic tire described above, as illustrated in FIG. 2, the positions of the lug main grooves 11 are offset in the tire circumferential direction on either side of the tire equator CL, and an offset amount S of the lug main grooves 11 and a pitch P of the lug main grooves 11 in the tire circumferential direction preferably satisfies the relationship $0.3 \leq S/P \leq 0.5$. By offsetting the positions of the lug main grooves 11 in the tire circumferential direction on either side of the tire equator CL, a momentary increase in ground contact pressure and sudden deformation of the block end portions when the tire rotates can be suppressed, and heat build-up of the tread portion 1 can be reduced. When the ratio S/P of the offset amount S of the lug main grooves 11 and the pitch P of the lug main grooves 11 in the tire circumferential direction deviates from the range described above, the effect of enhancing low heat build-up is reduced.

In the pneumatic tire described above, as illustrated in FIG. 3, a groove depth D1 of the shoulder inclined grooves 12 at a central position in the longitudinal direction and a groove depth D2 of the lug main grooves 11 at a position 25% of the tread width TW from the tire equator CL preferably satisfy the relationship $0.3 \leq D1/D2 \leq 0.7$. Note that in the present embodiment, the shoulder inclined grooves 12 have a constant groove depth D1 throughout the entire length in the longitudinal direction. By the shoulder inclined grooves 12 being shallower than the lug main grooves 11, the traction performance at least until the intermediate stages of wear is sufficiently ensured, block rigidity near the shoulder inclined grooves 12 can be increased, and low heat build-up can be favorably ensured. Here, when the ratio D1/D2 of the groove depth D1 of the shoulder inclined grooves 12 and the groove depth D2 of the lug main grooves 11 is too small, the effect of enhancing traction performance is decreased. When the ratio D1/D2 is too large, the effect of enhancing low heat build-up is decreased.

In the pneumatic tire described above, as illustrated in FIG. 2, the center inclined grooves 13 connecting the lug main grooves 11 located on either side of the tire equator CL are formed, and a width W3 of the center inclined grooves 13 at the central position in the longitudinal direction and the width W1 of the lug main grooves 11 at the tread edge satisfy the relationship $0.3 \leq W3/W1 \leq 0.8$. By providing the center inclined grooves 13 that extend across the tire equator CL and connect the lug main grooves 11 in the center region of the tread portion 1 where the ground contact pressure is high, the grit can be discharged outward in the tire lateral direction via the lug main grooves 11, and the traction performance can be effectively enhanced. In the center region of the tread portion 1, the ground contact pressure is high and block deformation is great. However, by the center inclined grooves 13 being narrower than the lug main grooves 11 in the shoulder regions of the tread portion 1, block rigidity near the center inclined grooves 13 can be increased and low heat build-up can be favorably ensured. Here, when the ratio W3/W1 of the width W3 of the center inclined grooves 13 and the width W1 of the lug main grooves 11 is too small, the effect of enhancing traction performance is decreased. When the ratio W3/W1 is too large, the effect of enhancing low heat build-up is decreased.

In the pneumatic tire described above, as illustrated in FIG. 3, a groove depth D3 of the center inclined grooves 13 at a central position in the longitudinal direction and the groove depth D2 of the lug main grooves 11 at a position 25% of the tread width TW from the tire equator CL preferably satisfy the relationship $0.3 \leq D3/D2 \leq 0.7$. Note that in the present embodiment, the center inclined grooves 13 have a constant groove depth D3 throughout the entire length in the longitudinal direction. By the center inclined grooves 13 being shallower than the lug main grooves 11, the traction performance at least until the intermediate stages of wear is sufficiently ensured, block rigidity near the center inclined grooves 13 can be increased, and low heat build-up can be favorably ensured. Here, when the ratio D3/D2 of the groove depth D3 of the center inclined grooves 13 and the groove depth D2 of the lug main grooves 11 is too small, the effect of enhancing traction performance is decreased. When the ratio D3/D2 is too large, the effect of enhancing low heat build-up is decreased.

Figure 5:
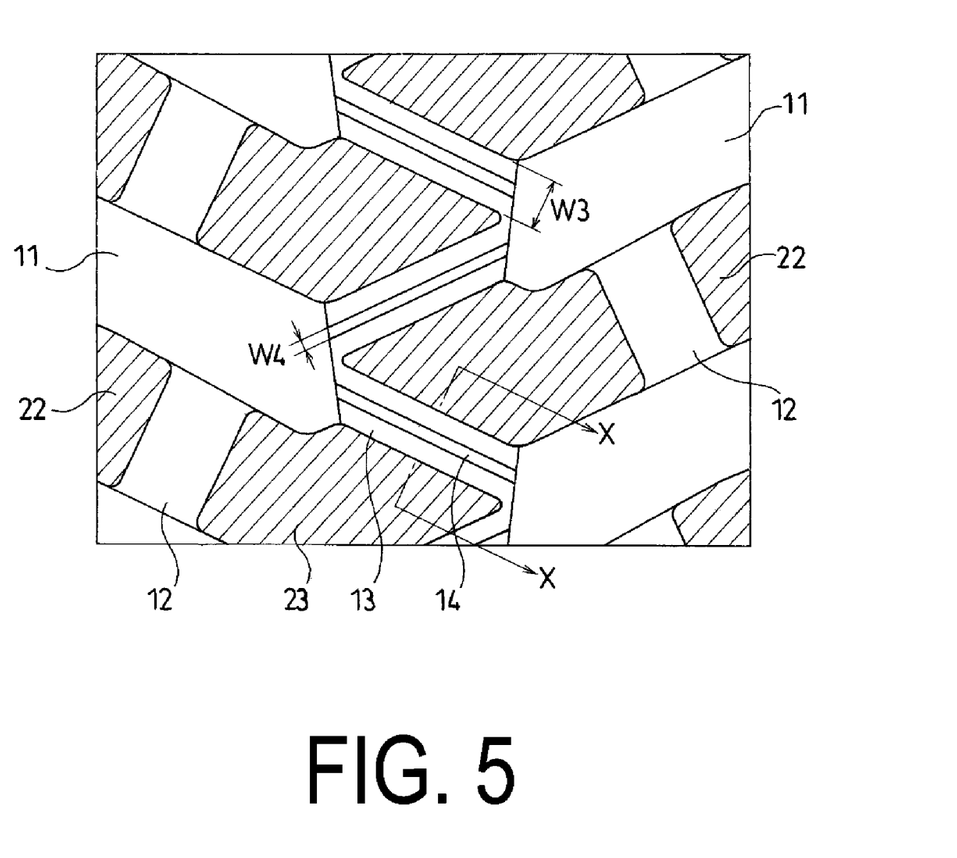
FIG. 5 is a plan view illustrating a center region of a tread pattern of a pneumatic tire according to another embodiment of the present technology.
Figure 6:
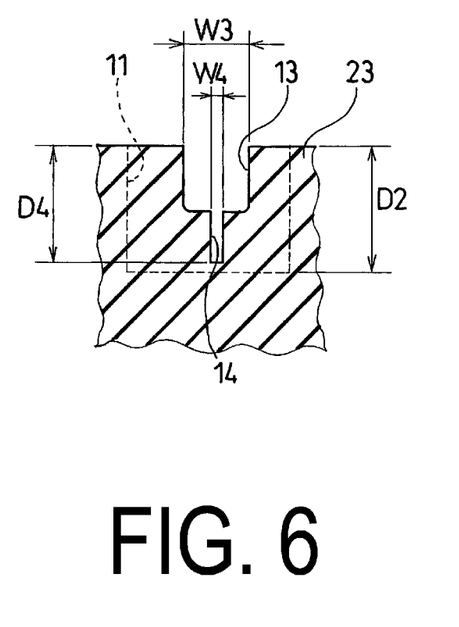
FIG. 6 is a cross-sectional view taken along line X-X of FIG. 5 in the direction of the arrows.

FIG. 5 illustrates a center region of a tread pattern of a pneumatic tire according to another embodiment of the present technology, and FIG. 6 illustrates a cross section of a main portion thereof. In FIGS. 5 and 6, components which are the same as those illustrated in FIGS. 1 to 3 are denoted by the same reference signs. Detailed descriptions for these components will be omitted. As illustrated in FIG. 5, narrow grooves 14 that open at both ends to the lug main grooves 11 are formed in the bottom portion of the center inclined grooves 13. The narrow grooves 14 extend in the longitudinal direction of the center inclined grooves 13 at the center position in the width direction of the center inclined grooves 13. A width W4 of the narrow grooves 14 and a width W3 of the center inclined grooves 13 at a central position in the longitudinal direction satisfy the relationship $0.05 \leq W4/W3 \leq 0.5$, and more preferably the relationship $0.1 \leq W4/W3 \leq 0.3$.

By providing the narrow groove 14 in the bottom portion of the center inclined groove 13 disposed in the center region of the tread portion 1 where the ground contact pressure is high in this way, heat dissipation efficiency can be increased and low heat build-up can be effectively enhanced. Moreover, since the narrow grooves 14 are narrower than the center inclined grooves 13, an increase in the heat build-up caused by block movement can be suppressed without impairing the block rigidity near the center inclined grooves 13. Here, when the width W4 of the narrow groove 14 is too small, the effect of increasing heat dissipation efficiency is decreased. When the width W4 is too large, the block rigidity near the center inclined grooves 13 is decreased and heat build-up easily occurs.

As illustrated in FIG. 6, a groove depth D4 of the narrow groove 14 at a central position in the longitudinal direction, with the road contact surface of the tread portion 1 as a reference, and the groove depth D2 of the lug main grooves 11 at a position 25% of the tread width TW from the tire equator CL preferably satisfy the relationship 0.5≤D4/D2≤1.0. By specifying the groove depth D4 of the narrow groove 14, the traction performance at least until the intermediate stages of wear is sufficiently ensured, and low heat build-up can be favorably ensured without impairing the block rigidity near the center inclined grooves 13. Here, when the groove depth D4 of the narrow groove 14 is too small, the effect of increasing heat dissipation efficiency is decreased. When the groove depth D4 is too large, the block rigidity near the center inclined grooves 13 is decreased and heat build-up easily occurs.

Figure 7:
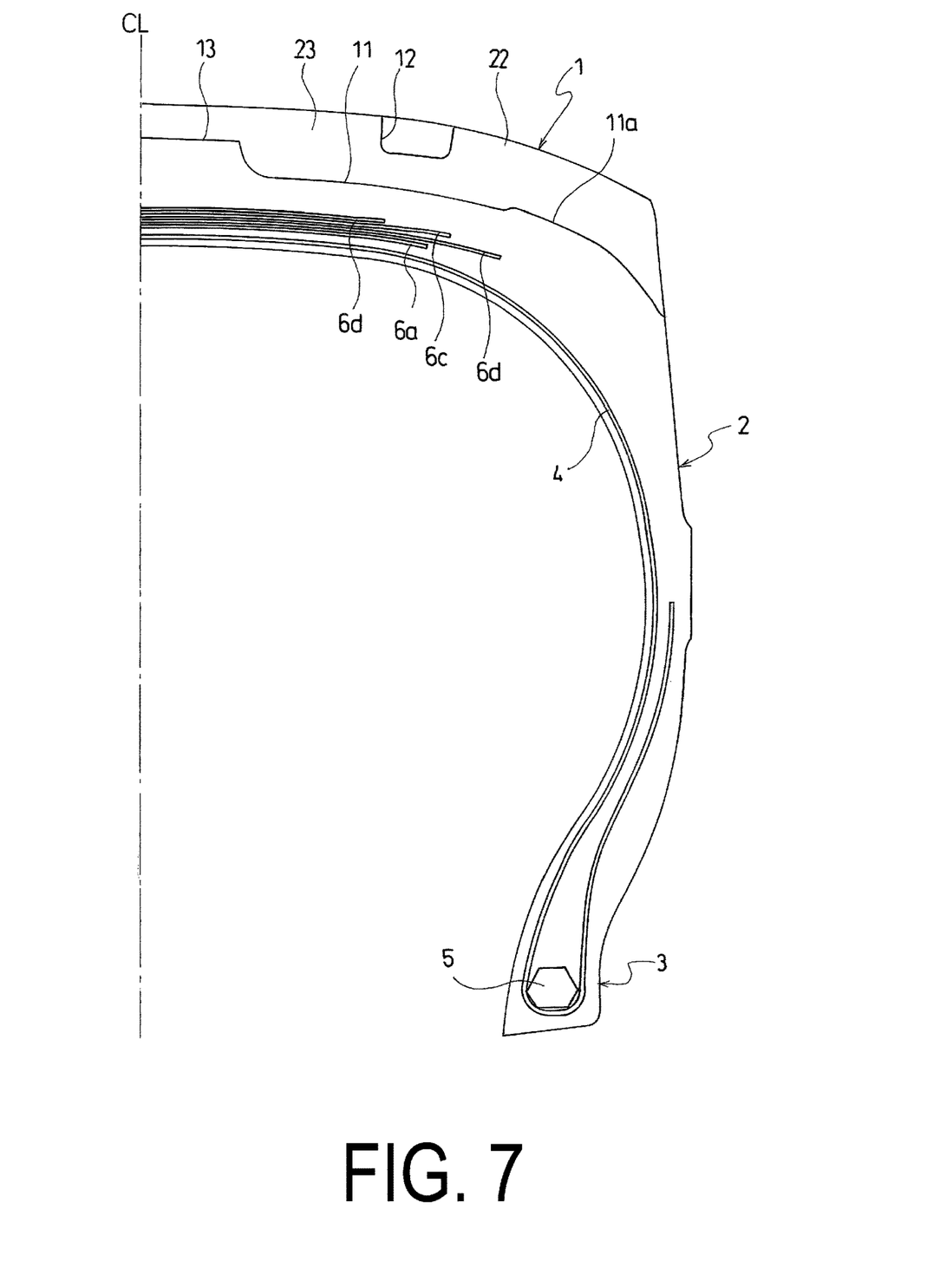
FIG. 7 is a meridian half cross-sectional view illustrating a pneumatic tire according to yet another embodiment of the present technology.

FIG. 7 illustrates a pneumatic tire according to yet another embodiment of the present technology. In FIG. 7, components identical to those illustrated in FIGS. 1 to 3 are denoted by the same reference signs. Detailed descriptions for these components are omitted. As illustrated in FIG. 7, the pneumatic tire of the present embodiment includes a raised bottom portion 11a formed in the portion located outward from the lug main groove 11 in the tire lateral direction. Such a raised bottom portion 11a contributes to enhancing uneven wear resistance.

The pneumatic tire according to an embodiment of the present technology has various applications, is suitable for construction vehicles, and is particularly suitable for a scraper vehicle.

EXAMPLES

Pneumatic tires according to Comparative Examples 2 to 10 and Examples 1 to 13 were manufactured. The pneumatic tires have a tire size of 37.25R35, have a directional tread pattern such as that illustrated in FIG. 2, and include an annular tread portion that extends in the tire circumferential direction, a pair of sidewall portions disposed on both sides of the tread portion, and a pair of bead portions disposed inward of the sidewall portions in the tire radial direction. Also, the tires are set according to Tables 1 to 3 for the following: inclination angle α of lug main grooves with respect to the tire lateral direction at a position 25% of the tread width from the tire equator, inclination direction of the shoulder inclined grooves, ratio ((L1+L2)/2)/TW of the average value of the distances L1, L2 to the tread width TW, ratio |L1−L2|/TW of the difference of the distances L1, L2 to the tread width TW, groove area ratio of the tread portion, ratio S/P of the offset amount S of the lug main grooves and the pitch P of the lug main grooves in the tire circumferential direction, ratio W3/W1 of the width W3 of the center inclined grooves at a central position in the longitudinal direction and the width W1 of the lug main grooves at the tread edge, ratio D1/D2 of the groove depth D1 of the shoulder inclined grooves at a central position in the longitudinal direction and the groove depth D2 of the lug main grooves at a position 25% of the tread width from the tire equator, ratio D3/D2 of the groove depth D3 of the center inclined grooves at a central position in the longitudinal direction and the groove depth D2 of the lug main grooves at a position 25% of the tread width from the tire equator, ratio W4/W3 of the width W4 of the narrow groove and the width W3 of the center inclined grooves at a central position in the longitudinal direction, and ratio D4/D2 of the groove depth D4 of the narrow groove with the road contact surface of the tread portion as a reference and the groove depth D2 of the lug main grooves at a position 25% of the tread width from the tire equator.

Note that in Tables 1 to 3, dimension requirements relating to the center inclined grooves and the narrow grooves are left blank for configuration without the center inclined grooves and the narrow grooves. For the inclined direction of the shoulder inclined grooves, configurations in which the direction is the same as that of the lug main grooves are indicated as "same direction", and configurations in which the direction is the opposite of that of the lug main grooves are indicated as "opposite direction".

For comparison, a tire according to the Conventional Example was prepared. This tire includes a non-directional tread pattern in which lug main grooves extending in the tire lateral direction and opening to the tread edges are formed in the tread portion on either side of the tire equator, and the lug main grooves are inclined in the same direction with respect to the tire lateral direction on either side of the tire equator. Also, a tire according Comparative Example 1 was prepared. The tire has the same configuration as Example 1 except that the lug main grooves are inclined in the same direction with respect to the tire lateral direction on either side of the tire equator.

These test tires were evaluated for traction performance and low heat build-up according to the following evaluation methods. The results thereof are shown in Tables 1 to 3.

Traction Performance:

Each of the test tires was mounted on a rim, adjusted to an air pressure of 525 kPa, and mounted on a scraper vehicle. The slip ratio of the tires was measured when the scraper vehicle performed leveling of a road surface. Here, the slip ratio (S) of the tire can be calculated based on the formula S=[(V2−V1)/V2]/100% using the measured speed of the vehicle (V1) and the speed of the tire outer circumferential surface (V2). The evaluation results are expressed as index values using the reciprocal of the measurement values, with the Conventional Example being assigned the index value of 100. Larger index values indicate superior traction performance.

Low Heat Build-Up:

Each of the test tires was mounted on a rim, adjusted to an air pressure of 525 kPa, and mounted on an indoor drum testing machine. The tires were run at a load of 231 kN at a speed of 10 km/h for 20 hours. Then the surface temperature of the tread portion was measured. The evaluation results are expressed as index values using the reciprocal of the measurement values, with the Conventional Example being assigned the index value of 100. Larger index values indicate superior low heat build-up.

TABLE 1-1

|  | Conventional Example | Comparative Example 1 | Comparative Example 2 | Comparative Example 3 |
|---|---|---|---|---|
| Directional tread pattern | Non-directional | Non-directional | Directional | Directional |
| Inclination angle α of lug main grooves (°) | 30 | 30 | 10 | 50 |
| Inclination direction of shoulder inclined grooves | — | Opposite direction | Opposite direction | Opposite direction |
| Ratio ((L1 + L2)/2)/TW | — | 0.25 | 0.25 | 0.25 |
| Ratio |L1 − L2|/TW | — | 0.10 | 0.10 | 0.10 |
| Groove area ratio of tread portion | 0.6 | 0.6 | 0.6 | 0.6 |
| Ratio S/P | — | 0.5 | 0.5 | 0.5 |
| Ratio W3/W1 | — | — | — | — |
| Ratio D1/D2 | — | 0.5 | 0.5 | 0.5 |
| Ratio D3/D2 | — | — | — | — |
| Ratio W4/W3 | — | — | — | — |
| Ratio D4/D2 | — | — | — | — |

TABLE 1-1-continued

|  | Conventional Example | Comparative Example 1 | Comparative Example 2 | Comparative Example 3 |
|---|---|---|---|---|
| Traction performance (index value) | 100 | 90 | 90 | 90 |
| Low heat build-up (index value) | 100 | 115 | 109 | 121 |

TABLE 1-2

|  | Comparative Example 4 | Comparative Example 5 | Comparative Example 6 |
|---|---|---|---|
| Directional tread pattern | Directional | Directional | Directional |
| Inclination angle α of lug main grooves (°) | 30 | 30 | 30 |
| Inclination direction of shoulder inclined grooves | Opposite direction | Opposite direction | Opposite direction |
| Ratio ((L1 + L2)/2)/TW | 0.10 | 0.40 | 0.25 |
| Ratio \|L1 − L2\|/TW | 0.10 | 0.10 | 0.02 |
| Groove area ratio of tread portion | 0.6 | 0.6 | 0.6 |
| Ratio S/P | 0.5 | 0.5 | 0.5 |
| Ratio W3/W1 | — | — | — |
| Ratio D1/D2 | 0.5 | 0.5 | 0.5 |
| Ratio D3/D2 | — | — | — |
| Ratio W4/W3 | — | — | — |
| Ratio D4/D2 | — | — | — |
| Traction performance (index value) | 120 | 120 | 120 |
| Low heat build-up (index value) | 92 | 86 | 98 |

TABLE 2-1

|  | Comparative Example 7 | Comparative Example 8 | Comparative Example 9 | Comparative Example 10 |
|---|---|---|---|---|
| Directional tread pattern | Directional | Directional | Directional | Directional |
| Inclination angle α of lug main grooves (°) | 30 | 30 | 30 | 30 |
| Inclination direction of shoulder inclined grooves | Opposite direction | Opposite direction | Opposite direction | Same direction |
| Ratio ((L1 + L2)/2)/TW | 0.25 | 0.25 | 0.25 | 0.25 |
| Ratio \|L1 − L2\|/TW | 0.25 | 0.10 | 0.10 | 0.10 |
| Groove area ratio of tread portion | 0.6 | 0.3 | 0.8 | 0.6 |
| Ratio S/P | 0.5 | 0.5 | 0.5 | 0.5 |
| Ratio W3/W1 | — | — | — | — |
| Ratio D1/D2 | 0.5 | 0.5 | 0.5 | 0.5 |
| Ratio D3/D2 | — | — | — | — |
| Ratio W4/W3 | — | — | — | — |
| Ratio D4/D2 | — | — | — | — |
| Traction performance (index value) | 120 | 81 | 150 | 120 |
| Low heat build-up (index value) | 92 | 144 | 90 | 98 |

TABLE 2-2

|  | Example 1 | Example 2 | Example 3 | Example 4 |
|---|---|---|---|---|
| Directional tread pattern | Directional | Directional | Directional | Directional |
| Inclination angle α of lug main grooves (°) | 30 | 30 | 30 | 30 |
| Inclination direction of shoulder inclined grooves | Opposite direction | Opposite direction | Opposite direction | Opposite direction |
| Ratio ((L1 + L2)/2)/TW | 0.25 | 0.30 | 0.25 | 0.25 |
| Ratio \|L1 − L2\|/TW | 0.10 | 0.10 | 0.04 | 0.15 |
| Groove area ratio of tread portion | 0.6 | 0.6 | 0.6 | 0.6 |
| Ratio S/P | 0.5 | 0.5 | 0.5 | 0.5 |
| Ratio W3/W1 | — | — | — | — |
| Ratio D1/D2 | 0.5 | 0.5 | 0.5 | 0.5 |
| Ratio D3/D2 | — | — | — | — |
| Ratio W4/W3 | — | — | — | — |
| Ratio D4/D2 | — | — | — | — |
| Traction performance (index value) | 120 | 120 | 120 | 120 |
| Low heat build-up (index value) | 115 | 104 | 112 | 102 |

TABLE 3-1

|  | Example 5 | Example 6 | Example 7 | Example 8 | Example 9 |
|---|---|---|---|---|---|
| Directional tread pattern | Directional | Directional | Directional | Directional | Directional |
| Inclination angle α of lug main grooves (°) | 30 | 30 | 30 | 30 | 30 |
| Inclination direction of shoulder inclined grooves | Opposite direction | Opposite direction | Opposite direction | Opposite direction | Opposite direction |
| Ratio ((L1 + L2)/2)/TW | 0.25 | 0.25 | 0.25 | 0.25 | 0.25 |
| Ratio \|L1 − L2\|/TW | 0.10 | 0.10 | 0.10 | 0.10 | 0.10 |
| Groove area ratio of tread portion | 0.6 | 0.6 | 0.6 | 0.6 | 0.6 |
| Ratio S/P | 0.5 | 0.5 | 0.5 | 0.5 | 0.5 |
| Ratio W3/W1 | 0.5 | 0.9 | 0.5 | 0.5 | 0.5 |
| Ratio D1/D2 | 0.5 | 0.5 | 0.2 | 0.8 | 0.5 |
| Ratio D3/D2 | 0.5 | 0.5 | 0.5 | 0.5 | 0.8 |
| Ratio W4/W3 | — | — | — | — | — |
| Ratio D4/D2 | — | — | — | — | — |

TABLE 3-1-continued

|  | Example 5 | Example 6 | Example 7 | Example 8 | Example 9 |
|---|---|---|---|---|---|
| Traction performance (index value) | 132 | 132 | 102 | 138 | 138 |
| Low heat build-up (index value) | 127 | 101 | 102 | 104 | 104 |

TABLE 3-2

|  | Example 10 | Example 11 | Example 12 | Example 13 |
|---|---|---|---|---|
| Directional tread pattern | Directional | Directional | Directional | Directional |
| Inclination angle α of lug main grooves (°) | 30 | 30 | 30 | 30 |
| Inclination direction of shoulder inclined grooves | Opposite direction | Opposite direction | Opposite direction | Opposite direction |
| Ratio ((L1 + L2)/2)/TW | 0.25 | 0.25 | 0.25 | 0.25 |
| Ratio |L1 − L2|/TW | 0.10 | 0.10 | 0.10 | 0.10 |
| Groove area ratio of tread portion | 0.6 | 0.6 | 0.6 | 0.6 |
| Ratio S/P | 0.5 | 0.5 | 0.5 | 0.5 |
| Ratio W3/W1 | 0.5 | 0.5 | 0.5 | 0.5 |
| Ratio D1/D2 | 0.5 | 0.5 | 0.5 | 0.5 |
| Ratio D3/D2 | 0.5 | 0.5 | 0.5 | 0.5 |
| Ratio W4/W3 | 0.2 | 0.6 | 0.2 | 0.2 |
| Ratio D4/D2 | 0.8 | 0.8 | 0.6 | 1.1 |
| Traction performance (index value) | 139 | 138 | 139 | 139 |
| Low heat build-up (index value) | 139 | 106 | 127 | 124 |

As is clear from Tables 1 to 3, as compared with the Conventional Example, with each of the tires of Examples 1 to 13, traction performance and low heat build-up were superior. In contrast, with the tires of Comparative Examples 1 to 3 and 8, although there was no problem with low heat build-up, traction performance was reduced. In addition, although the tires of Comparative Examples 4 to 7, 9, and 10 did not have a problem with traction performance, low heat build-up was reduced.

The invention claimed is:

1. A pneumatic tire, comprising:
an annular tread portion extending in a tire circumferential direction;
a pair of sidewall portions disposed on either side of the tread portion; and
a pair of bead portions disposed inward of the sidewall portions in a tire radial direction; wherein
lug main grooves extending in a tire lateral direction and opening to a tread edge being formed on either side of a tire equator in the tread portion, the lug main grooves being inclined with respect to the tire lateral direction in a symmetrical manner about the tire equator, and an inclination angle α of the lug main grooves with respect to the tire lateral direction at a position 25% of a tread width from the tire equator being set to a range 15°≤α≤45°;
shoulder inclined grooves connecting lug main grooves adjacent in the tire circumferential direction being formed in the tread portion, the shoulder inclined grooves each being inclined in an opposite direction to a corresponding lug main groove of the lug main grooves, a center line of the shoulder inclined grooves at both sides meeting with two of the lug main grooves at two intersection points P1, P2, a difference between a distance L1 from the tire equator to the intersection point P1 and a distance L2 from the tire equator to the intersection point P2 and a tread width TW satisfy a relationship TW×0.03≤|L1−L2|≤TW×0.2, and an average value of the distances L1, L2 and the tread width TW satisfy a relationship TW×0.15≤(L1+L2)/2≤TW×0.35;
a groove area ratio of the tread portion being from 0.4 to 0.7;
a width W1 of the lug main grooves at the tread edge and an interval W2 between the lug main grooves at the tread edge satisfies 0.7≤W1/W2≤1.5;
positions of the lug main grooves are offset in the tire circumferential direction on either side of the tire equator; and
an offset amount S of the lug main grooves and a pitch P of the lug main grooves in the tire circumferential direction satisfy a relationship 0.3≤S/P≤0.5.

2. The pneumatic tire according to claim 1, wherein
a groove depth D1 of the shoulder inclined grooves at a central position in a longitudinal direction and a groove depth D2 of the lug main grooves at a position 25% of the tread width from the tire equator satisfy a relationship 0.3≤D1/D2≤0.7.

3. The pneumatic tire according to claim 1, wherein
center inclined grooves connecting the lug main grooves located on either side of the tire equator are formed in the tread portion; and
a width W3 of the center inclined grooves at a central position in a longitudinal direction and the width W1 of the lug main grooves at the tread edge satisfy a relationship 0.3≤W3/W1≤0.8.

4. The pneumatic tire according to claim 3, wherein
a groove depth D3 of the center inclined grooves at a central position in a longitudinal direction and a groove depth D2 of the lug main grooves at a position 25% of the tread width from the tire equator satisfy a relationship 0.3≤D3/D2≤0.7.

5. The pneumatic tire according to claim 4, wherein
a narrow groove that opens at both ends to the lug main grooves is formed at a bottom portion of each of the center inclined grooves; and
a width W4 of the narrow groove and the width W3 of the center inclined grooves at the central position in the longitudinal direction satisfy a relationship 0.05≤W4/W3≤0.5.

6. The pneumatic tire according to claim 5, wherein
a groove depth D4 of the narrow groove with a road contact surface of the tread portion as a reference and the groove depth D2 of the lug main grooves at a position 25% of the tread width from the tire equator satisfy a relationship 0.5≤D4/D2≤1.0.

7. The pneumatic tire according to claim 2, wherein
center inclined grooves connecting the lug main grooves located on either side of the tire equator are formed in the tread portion; and a width W3 of the center inclined grooves at a central position in a longitudinal direction and the width W1 of the lug main grooves at the tread edge satisfy a relationship $0.3 \leq W3/W1 \leq 0.8$.

8. The pneumatic tire according to claim 7, wherein
a groove depth D3 of the center inclined grooves at a central position in a longitudinal direction and a groove depth D2 of the lug main grooves at a position 25% of the tread width from the tire equator satisfy a relationship $0.3 \leq D3/D2 \leq 0.7$.

9. The pneumatic tire according to claim 8, wherein
a narrow groove that opens at both ends to the lug main grooves is formed at a bottom portion of each of the center inclined grooves; and
a width W4 of the narrow groove and the width W3 of the center inclined grooves at the central position in the longitudinal direction satisfy a relationship $0.05 \leq W4/W3 \leq 0.5$.

10. The pneumatic tire according to claim 9, wherein
a groove depth D4 of the narrow groove with a road contact surface of the tread portion as a reference and the groove depth D2 of the lug main grooves at a position 25% of the tread width from the tire equator satisfy a relationship $0.5 \leq D4/D2 \leq 1.0$.

11. The pneumatic tire according to claim 1, wherein the inclination angle $\alpha$ of the lug main grooves with respect to the tire lateral direction at the position 25% of the tread width from the tire equator is set to a range $15° \leq \alpha \leq 40°$.

12. The pneumatic tire according to claim 1, wherein the groove area ratio of the tread portion is from 0.4 to 0.55.

* * * * *